No. 870,965. PATENTED NOV. 12, 1907.
J. HUTCHINGS.
TIDE OR WAVE MOTOR.
APPLICATION FILED DEC. 4, 1905. RENEWED SEPT. 13, 1907.

3 SHEETS—SHEET 1.

No. 870,965. PATENTED NOV. 12, 1907.
J. HUTCHINGS.
TIDE OR WAVE MOTOR.
APPLICATION FILED DEC. 4, 1905. RENEWED SEPT. 13, 1907.

3 SHEETS—SHEET 3.

UNITED STATES PATENT OFFICE.

JOHN HUTCHINGS, OF LONDON, ENGLAND.

TIDE OR WAVE MOTOR.

No. 870,965.          Specification of Letters Patent.          Patented Nov. 12, 1907.

Application filed December 4, 1905. Serial No. 290,238. Renewed September 13, 1907. Serial No. 392,762.

*To all whom it may concern:*

Be it known that I, JOHN HUTCHINGS, subject of the King of Great Britain, residing at 210 Moorgate Station Chambers, Moorfields, in the city of London, England, engineer, have invented certain new and useful improvements in and relating to means and apparatus for generating motive power from the movements of tides, waves, or the like movements of water, of which the following is a specification.

This invention is designed to provide means whereby to generate power from the movements of tides, waves, or the like movements of water.

The present means and apparatus are designed to be employed in generating motive power from the motions of the waves and tides or the like of the ocean, or other waters and are adapted for acting on a combined floating buoy and water compartment hung to and working underneath or adjoining a landing or pleasure pier, bridge, docks or the like, built and securely fixed by legs or tubes or the like to the bottom of the ocean, the main principles of construction and operation being adapted to the particular circumstances of the case.

The accompanying three sheets of drawings will serve to illustrate my invention, in which:—

Figure 1:
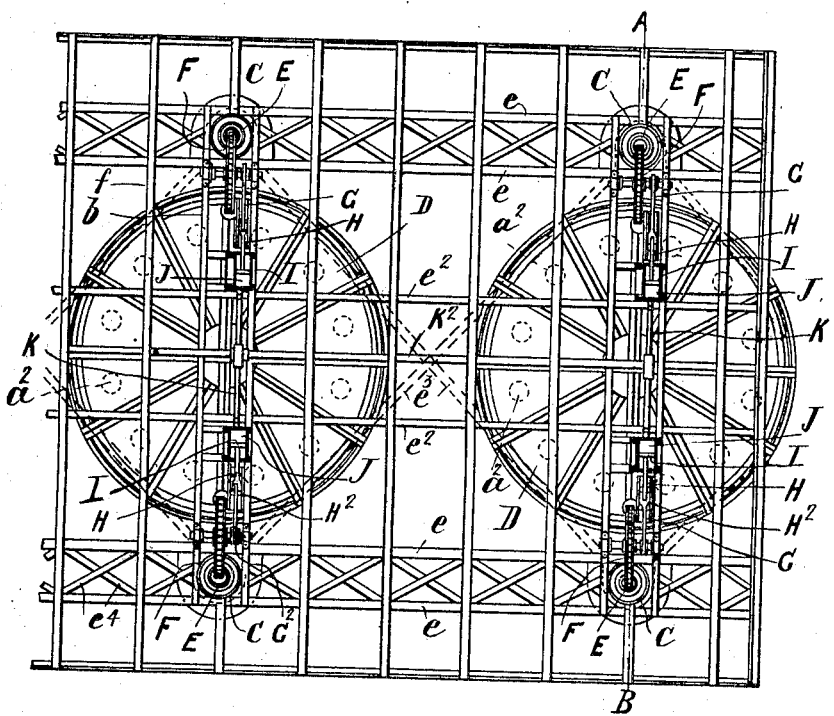
Figure 2:
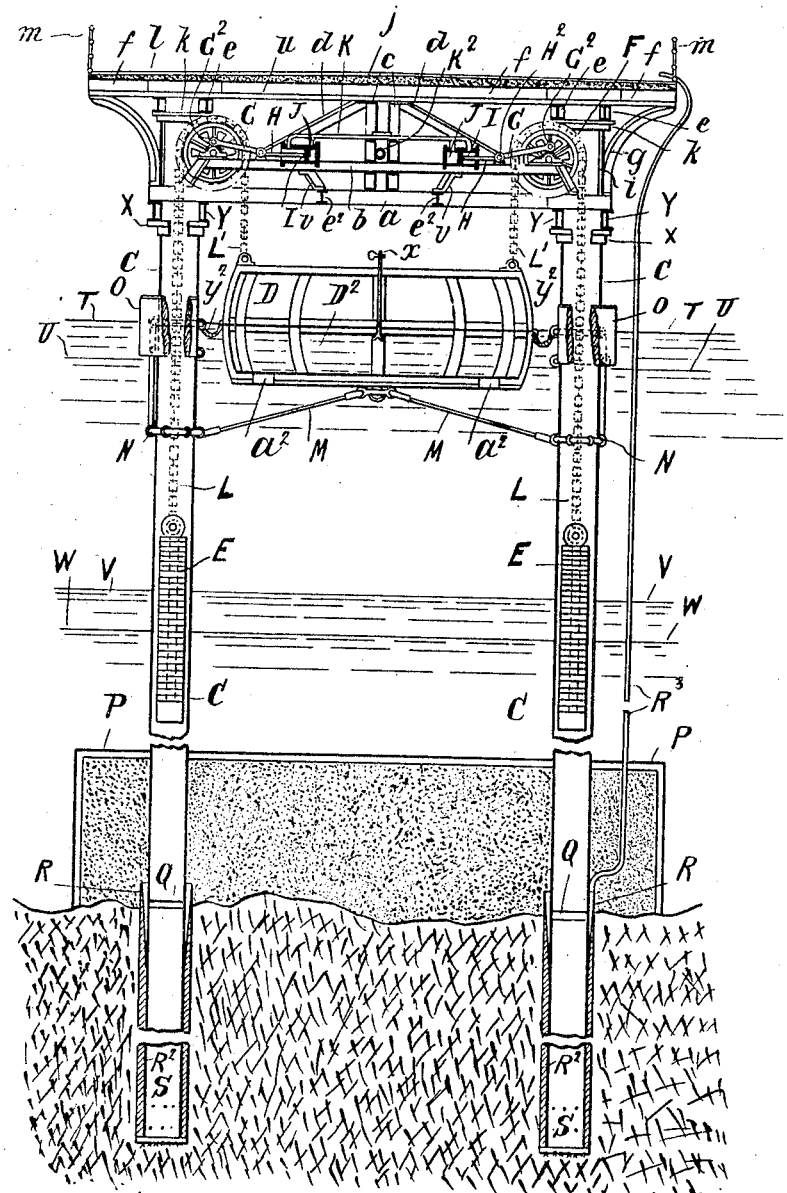
Figure 3:
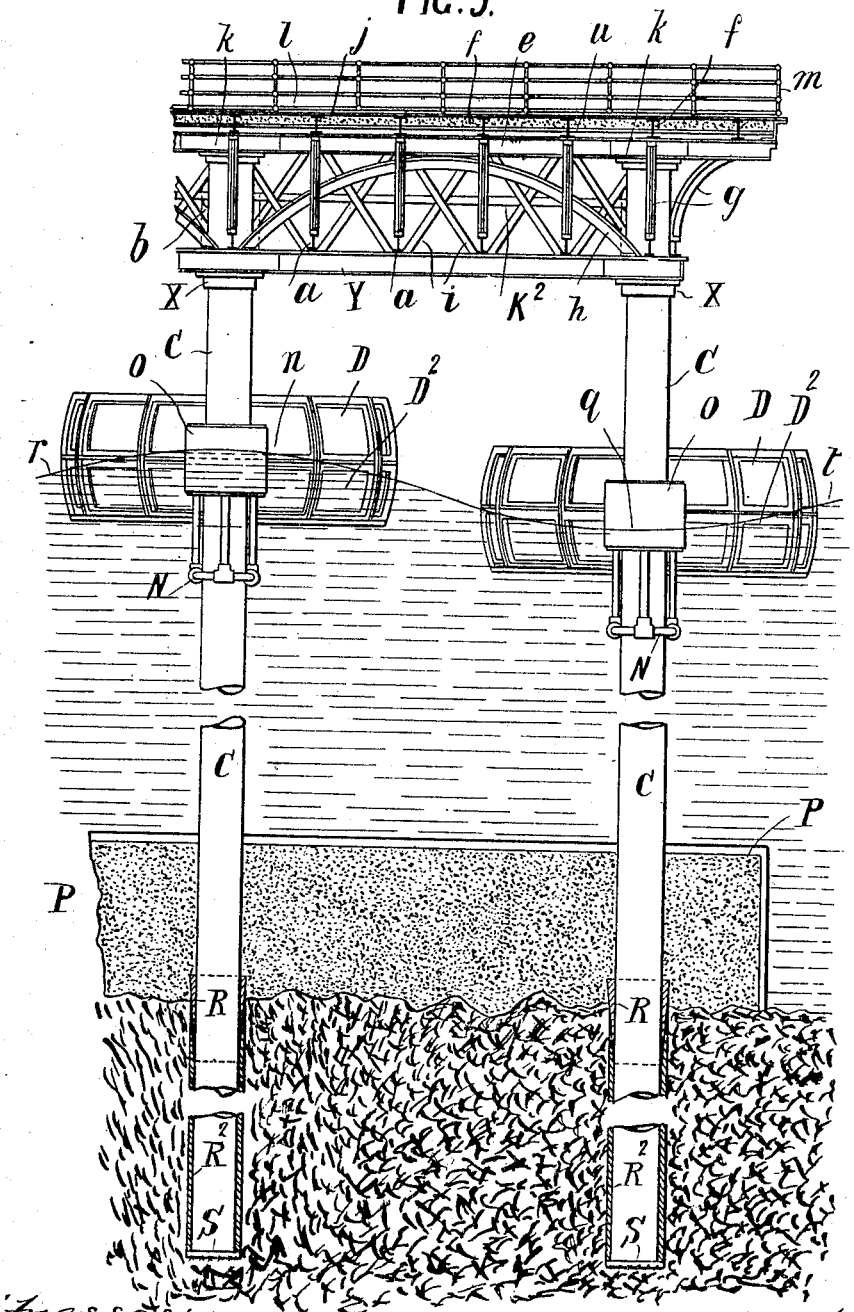

Figure 1 is a plan view of Figs. 2 and 3, showing the position of the supporting legs or tubular columns at C, C. The power buoys D, D, the balancing weights E, E, the toothed or sprocket pulley wheels F, the connecting crank rods G, the piston rods H, the pistons I, the compression chambers J, the conducting pipes K, and $K^2$, and the general horizontal constructional features of the framing forming the power generating pier. Fig. 2 is a cross section on line A, B, of Fig. 1 showing the relative positions in a sectional view of the parts including the supporting legs or tubular columns C, the combined power buoy D, and water compartment $D^2$, the balancing weights E, E, the toothed or sprocket pulley wheels F, the connecting crank rods G, the piston rods H, the piston I, the pumping or compression cylinders J, the conducting pipes K, $K^2$, the plate link and bar or other suitable chain L, the anchor ropes or rods M, the anti-friction anchor fittings N, the anchor regulating and controlling buoy O, O, the supporting foundation concrete tank P, the interior column wedge supports Q, the foundation column socket wedges R, the column diamond boring heads S, the position in altitude of the highest and lowest spring and neap tides, as at T, U, V, W, and the general vertical cross sectional features of the construction of the pier. Fig. 3 is a side elevation of Figs. 1 and 2 showing an exterior elevation view of the projected end and moving parts of a power generating pier, including the combined power buoys D, and water compartment $D^2$, the conducting pipes $K^2$, the anchor fittings N, the anchor regulating and controlling buoys O, the supporting legs or tubular columns C, the supporting foundation concrete tank P, the foundation column socket wedges R, the column diamond boring heads S, and the general exterior constructional features of this pier.

The point $n$, is the crest or top of a wave while the point $q$, Fig. 3, is the trough between the waves in mild weather illustrating the movements which generate power continually produced on the power buoys D, D, while afloat.

The line $r, t$, therefore represents the ever varying double flexure surface line of the water in which the apparatus is intended to work, whereby the up and down movements are induced.

The apparatus for effecting the above object consists of a number of supporting legs C, bored into the bottom of the sea, lake or river (according to the requirements consistent with the length along the sea shore, or out into the water a pier may be extended) a combined power buoy D, and water compartment $D^2$, the balancing weights E, the plate link or other suitable chain L, the toothed or sprocket pulley wheels F, the connecting crank rods G, the piston rods H, the compression or pumping piston ring I, the pumping or compression cylinders J, the conducting pipes K, and $K^2$, the anchor ropes or rods or the like M, the anchor fittings N, the anchor regulating and controlling buoy O, the supporting foundation concrete tank P, the interior column wedge supports Q, the foundation column socket wedges R, the column diamond boring heads or crowns S, the column abacus collars X, the transom stringer tie-beam or bearers Y, the transverse tie-beams $a$, the compressor and pulley bearing beam $b$, the twin king posts $c$, the struts $d$, the top string bearer $e$, the transverse deck bearers $f$, the curved brackets $g$, the bow or chord strut piece $h$, Fig. 3, the lattice bracing $i$, the concrete deck floor $j$, the top column abacus collars $k$, the deck covering $l$, the concrete bearer or sub-deck plates $u$, the central string beams $e^2$, or machinery room floor bearers the diagonal horizontal lattice bracing $e^4$, Fig. 1. When these parts have been erected the generation of power is effected by fixing the power buoy D, in conjunction with anchor controlling buoys O, and their anchor fittings N, and rod or rope connections M, Fig. 2, into their working positions and by opening a valve $x$, air is allowed to escape from the water compartment $D^2$, when water is admitted in its place through bottom apertures $a^2$, $a^2$, Fig. 2 until sufficient water has been admitted to make the weight of water in the water compartment $D^2$ plus the weight of the material forming the buoy D, and the portion of the anchor rods or ropes M, held under the buoy D, equal to more than twice the weight of the weight E and chain L including the weight required to overcome any friction during working of the wheel F and chain L all of which combined are equal to the buoyancy obtained by the confined air in the buoy D.

When the buoy D, has been sunk to its working depth the pulley connecting chains L, are fixed to the top of the buoy at L′, having previously been affixed to the weight E, suspended inside the tubular column C, Figs. 1 and 2. As shown by Fig. 1 this chain L is fixed upon and engages with the revolving sprocket wheel F, the axle shaft of which forms the center of axis upon which the wheel E, is made to revolve to and fro through the chain L, by movements of the buoy D.

To effect proper control by the buoy D, of a simultaneously responding up or down movement of the weights E, and at the same time to generate power through the chain L, by means of up or down movements of the buoy D, caused by waves, tides, or the like, it is necessary that the falling weight of the buoy D, and combined water tank $D^2$, should be equal to more than twice that of the weights E plus the weight absorbed by friction by the chain L, working with and over the sprocket wheel F, and that the buoyancy of the buoy D, should be correspondingly equal to the whole falling weight of the combined buoy D, and its water compartment $D^2$ plus the buoyancy absorbed by the friction of the chain L, working over and in conjunction with the sprocket wheel F. This balancing is necessary if an equality of pressure is to be attained in the compression or pumping cylinders J, J.

When the buoy D, and its subtended water compartment $D^2$, falls into a trough between waves in water, moving from the position of $n$, to that of $q$, Fig. 3, in its downward direction it has first to overbalance and lift the weights E, Fig. 2, upwards by the chain L, a vertical height equal to the vertical depth of such fall of the buoy D, (through the movements of tides or waves) the balance of the falling weight of the buoy D, and water compartment $D^2$, which may not have been used in lifting the weights E is used through the sprocket wheels F crank rod G, piston rod H, and piston I, moving to and fro in the cylinders J, J, generating power by compression, the pressure of the piston I, against such water or air will be equal (less the friction of the machinery) to the remaining or unabsorbed portion of falling weight of the combined power buoy D, and water compartment $D^2$.

When the power buoy D, and water compartment $D^2$, is lifted by wave or tide movements from the position in a trough between waves as at $q$, to the position of $n$, on the crest or top of a wave Fig. 3, the weight E, Fig. 2, being held to the power buoy D, by the chain L, running over the sprocket wheel F, descends into the tubular columns C, a vertical depth equal to the vertical height ascended by the power buoy D. During the descending movement of the weight E caused by the ascending movement of the buoy D, the pressure in the cylinder J, J, will be equal to the weight E, less the pressure absorbed by the friction of the moving parts. This up and down movement of the power buoy D, by actuating the chain L, and causing the pulley wheel F, and its crank pin $G^2$, to rotate more or less whole or parts of cycles, to and fro according to the height of the generating tides or waves, forces the connected crank rods G, the slide blocks or cross heads $H^2$, the piston rod H, the double acting piston I, to and fro, within the double acting cylinders J, J, at each to or fro movement, compressing air, or force pumping water, forcing the same out of the double-acting cylinders J, J, through suitable valves into the conducting pipes K, and $K^2$ thence to be conserved and ultimately used as power for working machinery or other uses.

The power buoys D, D, Fig. 3, are anchored to their working positions by means of anchor ropes M, suspended anchor buoy fittings N, anchor controlling buoys O, and holding lines $y^2$, Figs. 2 and 3, in such a manner that the buoy O, moves truly up or down out of the way of the power buoy D, in its fixed position around the tubular column C, while by means of the suspended fittings N, the anchor ropes M are held down at a sufficient depth below the bottom of the power buoy D, to be quite out of the way of contact with the buoy D, while it is being lifted or lowered or tossed by waves or tides into positions while working at varying angles from the horizons.

The pier legs (or tubular columns C, C, Figs. 1, 2 and 3) may be bored into the bottom until a satisfactory foundation has been secured when the ferrules R, wedge shaped or inclined-mouthed are dropped to wedge the columns securely, while air is introduced through the flexible metallic or other suitable pipe $R^3$, into the clearance space $R^2$, around the base of the columns C, through suitably made valve port holes in the wedges R, Fig. 2. This air forces the water out of the space $R^2$ through suitable holes into the clearance space between the core and the inner surface of the column plating when liquid concrete is injected into the clearance space $R^2$ in the place of the ejected water. The columns C, may also be supported by concrete laid within an iron tank about the base of the columns on the bottom as at P, P, Figs. 2 and 3.

The construction of the pier superstructure is effected by fixing to the columns C, abacus collar brackets X, to carry longitudinal string tie-bearers Y, upon which rest transverse tie-beams $a$. Onto these beams are framed and fixed to rest, the machinery-bearers $b$, the struts $d$, the twin king posts $c$, the plates or braces $u$, and the conducting pipes K, and $K^2$.

The abacus collar brackets $k$, are fixed to the columns C at a point above the abacus X, and carry the longitudinal string bearers $e$, $e$. Upon these string bearers $e$, are fixed the transverse deck bearers $f$, upon the lower flanges of which are laid, riveted or bolted suitable plates at V, Figs. 2 and 3, which carry the floor $j$. On the top of the floor $j$, a suitable covering is laid.

The string bearers $e$, and transom tie-string bearers Y, are supported and braced by means of a bow or chord strut piece $h$, their springing ends resting on suitable chairs and cradles which convey their thrust on to the columns C, they are also supported by the diagonal lattice bracing $i$, Fig. 3. The projecting ends of the deck bearers $f$, are supported by the curved brackets $g$, and finished on the top by the railing $m$.

Having now particularly described and ascertained the nature of my said invention and in what manner the same is to be performed, I declare that what I claim is:—

1. An apparatus of the character described, comprising a foundation element, mooring members arranged below said element, a plurality of hollow supporting columns extending through said element and into said members, wedges for securing the columns to said members, a buoyant member, regulating buoys connected with said columns, flexible connections between said regulating buoys and said buoyant member, counterweights within said columns to counterbalance the weight of the buoyant member, a frame structure supported by the columns, flexible connections between the counterweights and said buoyant member, pulleys supported by said frame and over which said flexible connections travel, and power-generating devices connected with said pulleys and operated by the rise and fall of said buoyant member.

2. In an apparatus of the character described, the combination with a foundation element, mooring members arranged below said element and vertical members extending through said element and into said mooring members, of a counterweighted buoyant member interposed between said vertical members, power-generating devices operated by the rise and fall of said buoyant member, buoys connected with the vertical members, and flexible connections between the buoys and said buoyant member.

In testimony whereof I have hereunto set my hand in presence of two subscribing witnesses.

JOHN HUTCHINGS.

Witnesses:
ALFRED GEORGE BROOKES,
JOHN COODE HORE.